US008651573B2

(12) United States Patent
Ghisoni et al.

(10) Patent No.: US 8,651,573 B2
(45) Date of Patent: Feb. 18, 2014

(54) VEHICLE SEAT ASSEMBLY HAVING A SELF ADJUSTING SEAT CUSHION

(75) Inventors: Giuseppe Ghisoni, Milan (IT); Giorgio Ursino, Turin (IT)

(73) Assignee: Lear Corporation, Southfield, MI (US)

( * ) Notice: Subject to any disclaimer, the term of this patent is extended or adjusted under 35 U.S.C. 154(b) by 119 days.

(21) Appl. No.: 13/061,549

(22) PCT Filed: Oct. 7, 2008

(86) PCT No.: PCT/US2008/079011
§ 371 (c)(1),
(2), (4) Date: Mar. 1, 2011

(87) PCT Pub. No.: WO2010/042106
PCT Pub. Date: Apr. 15, 2010

(65) Prior Publication Data
US 2011/0175424 A1    Jul. 21, 2011

(51) Int. Cl.
*A47C 3/00* (2006.01)
*A47C 7/02* (2006.01)

(52) U.S. Cl.
USPC ............... 297/284.3; 297/452.22; 297/452.55

(58) Field of Classification Search
USPC ................ 297/284.2, 284.3, 452.22, 452.55, 297/452.56
See application file for complete search history.

(56) References Cited

U.S. PATENT DOCUMENTS

| 969,963 | A | | 9/1910 | Laa |
| 2,725,580 | A | | 12/1955 | Heller |
| 3,235,245 | A | | 2/1966 | Gaetan |
| 3,529,866 | A | * | 9/1970 | Getz ........................ 297/452.53 |
| 3,557,264 | A | * | 1/1971 | Getz ............................ 264/46.7 |
| 3,762,770 | A | * | 10/1973 | Tedesco et al. .......... 297/452.53 |
| 4,148,518 | A | | 4/1979 | Vilbeuf |
| 4,191,424 | A | * | 3/1980 | Mundell .................. 297/452.26 |
| 4,272,117 | A | | 6/1981 | Vilbeuf |
| 4,664,352 | A | | 5/1987 | Shibuki et al. |
| 4,938,529 | A | * | 7/1990 | Fourrey ..................... 297/284.9 |
| 5,088,793 | A | * | 2/1992 | Mithuhiro ................ 297/452.52 |
| 5,328,236 | A | * | 7/1994 | Mizushima et al. ....... 297/284.9 |
| 6,361,117 | B1 | | 3/2002 | Tate |
| 6,516,637 | B1 | * | 2/2003 | Fancher et al. ................. 66/170 |
| 6,520,577 | B2 | | 2/2003 | Kitagawa |
| 6,644,735 | B2 | | 11/2003 | Bargheer et al. |
| 6,672,666 | B2 | * | 1/2004 | Stiller et al. ............... 297/284.2 |
| 6,918,633 | B2 | | 7/2005 | Forkel et al. |
| 2005/0140199 | A1 | | 6/2005 | Kang et al. |

OTHER PUBLICATIONS

International Searching Authority, The International Search Report and the Written Opinion for corresponding PCT/US2008/79011 mailed Dec. 4, 2008.
German Patent & Trademark Office, Office Action for the corresponding German Patent Application No. 11 2008 004 026.5 mailed Nov. 7, 2013.

* cited by examiner

*Primary Examiner* — Sarah B McPartlin
(74) *Attorney, Agent, or Firm* — Brooks Kushman P.C.

(57) ABSTRACT

A vehicle seat assembly includes a seat bottom having a seat cushion and a seat bottom frame subassembly adjacent the cushion. The seat bottom frame subassembly has a platform portion with an aperture, a first substantially rigid support member suspended from the platform portion across the aperture, and a second substantially rigid support member suspended from the platform portion across the aperture. The first support member and the second support member are configured to move between the retracted position and a deployed position when a load is applied to the cushion. The first support member and the second support member cooperate to support the cushion when the first support member and the second support member are in the deployed position.

17 Claims, 4 Drawing Sheets

VEHICLE SEAT ASSEMBLY HAVING A SELF ADJUSTING SEAT CUSHION

CROSS-REFERENCE TO RELATED APPLICATIONS

This application is a U.S. national phase of PCT Appln. No. PCT/US2008/079011, filed Oct. 7, 2008, the disclosure of which is hereby incorporated by reference in its entirety.

BACKGROUND OF THE INVENTION

1. Field of the Invention

Embodiments of the invention disclosed herein relate to the field of vehicle seat assemblies having low profile seat bottoms.

2. Background Art

Some conventional vehicle seat assemblies, such as those installed in the rear portion of a passenger compartment of a vehicle, typically include a seat bottom having a metal wire frame, a foam cushion disposed over and supported by the metal wire frame and a trim material such as leather or cloth covering the cushion and the metal wire frame.

Conventional vehicle seat assemblies such as the one described above typically require a minimum combined thickness of a metal wire frame and a cushion to accommodate anticipated load forces encountered during vehicle operations. Some vehicles, however, may lack sufficient vertical space within the passenger compartment, and in particular, in the rear portion of the passenger compartment, to accommodate the minimum thicknesses associated with seats having the conventional metal wire frame and the seat cushion while also providing adequate headroom for a seat occupant. It is, therefore, desirable to have a vehicle seat assembly having a lower thickness seat cushion and a lower thickness frame to support the cushion resulting in a lower profile seat bottom to provide adequate headroom in confined vehicle spaces while also providing adequate comfort and support. The present invention addresses this and other problems.

SUMMARY OF THE INVENTION

Various embodiments of vehicle seat assemblies having a low profile seat bottom are disclosed herein. In a first embodiment, a vehicle seat assembly comprises a seat bottom that is configured for attachment to a vehicle. The seat bottom has a seat cushion and a seat bottom frame subassembly disposed adjacent the cushion. The seat bottom frame subassembly includes a platform portion having an aperture, a first substantially rigid support member suspended from the platform portion in a longitudinal direction across the aperture, and a second substantially rigid support member suspended from the platform portion in a longitudinal direction across the aperture. The first support member and the second support member are configured to move between a retracted position and a deployed position when a load is applied to the cushion. In this first embodiment, the first support member and the second support member cooperate with each other to support the cushion when the first support member and the second support member are in the deployed position.

In an implementation of the first embodiment, the first support member and the second support member are configured to pivot between the retracted position and the deployed position. In a variation of this implementation, the seat bottom further comprises a limiting member that is configured to inhibit movement of the first support member and the second support member beyond the deployed position.

In another implementation of the first embodiment, the seat bottom further comprises a biasing member that urges the first support member and the second support member towards the retracted position. In a variation of this implementation, the biasing member attaches the first support member to the second support member. In another variation of this implementation, the biasing member is a spring. In an alternate variation of this implementation, the biasing member comprises an elastic fabric material.

In another implementation of the first embodiment, the seat bottom further comprises a limiting member that connects the first support member to the second support member. The limiting member is configured to inhibit movement of the first support member and the second support member beyond the deployed position. In a variation of this implementation, the limiting member comprises a substantially inelastic fabric material. In another variation of this implementation, the limiting member comprises a rod having a first end having a first loop portion and a second end having a second loop portion. The first support member extends through the first loop portion and the second support member extends through the second loop portion.

In another implementation of the first embodiment, the first support member comprises a first end, a second end, and a first bent portion disposed between the first end and the second end of the first support member. The second support member comprises a first end, a second end, and a second bent portion disposed between the first end and the second end of the second support member. In a variation of this implementation, the vehicle seat assembly further comprises a biasing member urging the first bent portion and the second bent portion towards one another to retain the first support member and the second support in the retracted position in the absence of the load and wherein the first bent portion and the second bent portion are configured to face in a generally downward direction when the first support member and the second support member are in the deployed position. In an alternate variation of this implementation, the first bent portion is substantially coplanar with a remainder of the first support member and wherein the second bent portion is substantially coplanar with a remainder of the second support member.

In another implementation of the first embodiment, the platform portion includes a metal wire bordering the aperture. The first support member is configured to hook onto the metal wire and the second support member is configured to hook onto the metal wire.

In another implementation of the first embodiment, the first support member comprises a metal wire and the second support member comprises a metal wire.

In a second implementation, a vehicle seat assembly comprises a seat bottom that is configured for attachment to a vehicle. The seat bottom has a seat cushion and a seat bottom frame subassembly that is disposed adjacent the cushion. The seat bottom frame subassembly includes a platform portion having an aperture, a first substantially rigid support member that is suspended from the platform portion in a longitudinal direction across the aperture, and a second substantially rigid support member suspended from the platform portion in a longitudinal direction across the aperture. The first support member and the second support member are configured to pivot between a retracted position and a deployed position when a load is applied to the cushion. A biasing member connects the first support member to the second support member. The biasing member urges the first support member and the second support member towards the retracted position. In this second embodiment, the first support member and the second support member cooperate with each other to support the cushion when the first support member and the second support member are in the deployed position.

In an implementation of the second embodiment, the biasing member comprises an elastic fabric material. In an alternate variation of this embodiment, the seat bottom further comprises a limiting member that is configured to inhibit movement of the first support member and the second support member beyond the deployed position. In a variation of this implementation, the limiting member comprises a substantially inelastic fabric material.

In a third embodiment, a vehicle seat assembly comprises a seat bottom that is configured for attachment to a vehicle. The seat bottom has a seat cushion and a seat bottom frame subassembly that is disposed adjacent the cushion. The seat bottom frame subassembly includes a platform portion having an aperture, a first substantially rigid support member suspended from the platform portion in a longitudinal direction across the aperture, and a second substantially rigid support member suspended from the platform portion in a longitudinal direction. The first support member and the second support member are configured to pivot between a retracted position and a deployed position when a load is applied to the cushion. A spring connects the first support member to the second support member. The spring urges the first support member and the second member towards the retracted position. A rod connects the first support member and the second support member. The rod has a first end having a first loop portion and a second end having a second loop portion. The first support member extends through the first loop portion and the second support member extends through the second loop portion. The first loop portion and the second loop portion are configured to inhibit movement of the first support member and the second support member beyond the deployed position. In this third embodiment, the first support member and the second support member cooperate with each other to support the cushion when the first support member and the second support member are in the deployed position.

BRIEF DESCRIPTION OF THE DRAWINGS

The description herein makes reference to the accompanying drawings wherein like reference numerals refer to like parts throughout the several views, and in which.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limited, but merely as a representative basis for the claims and/or as a representative basis for teaching one skilled in the art to variously employ the present invention.

Vehicle seat assemblies made in accordance with the teachings of the present invention include seat bottoms having a height that is less than the height of conventional seat assemblies which have a seat frame including a series of transversely oriented metal wires forming a net to support a seat cushion. Rather than providing a seat frame having a network of metal wires, embodiments of the present invention include a platform portion that in some embodiments, include an abbreviated network of metal wires and a relatively large aperture. The aperture is disposed in a position that corresponds with an area of the seat bottom that supports the weight of a seat occupant.

First and second support members are suspended from opposite sides of the aperture and are oriented longitudinally with respect to the seat bottom. As used herein, "longitude" or "longitudinal" refers to the direction of vehicle travel. The support members may include a bend or bends that correspond to the curvature of a vehicle occupant's posterior. The first and second support members may be joined together by an elastic material that biases the bent portions of the first and second support members towards one another. In this manner, when the seat assembly is unoccupied, the elastic material may retain the first and second support members in a position such that the bent portions are facing or proximate one another. This will be referred to herein as the "retracted" position.

A seat cushion is disposed over the aperture and over the first and second support members. When a seat occupant sits in the vehicle seat assembly, the weight of the occupant is sufficient to overcome the biasing force of the elastic material and the bent portions of the first and second support members swing downward and outward away from one another.

In some embodiments, a limiting member such as an inelastic fabric material may be attached to the first and second support members to limit the downward and outward movement of the bent portions as the vehicle seat assembly is loaded. When the bent portions of the first and second support members are oriented in a generally downward direction and have swung outwardly as far as is permitted by the inelastic material, the first and second support members are in the deployed position. In embodiments that do not include an inelastic material or other mechanism or device for limiting the movement of the bent portions away from one another, reference to the "deployed" position refers to an orientation wherein the bent portions are oriented in a generally downward direction.

When the first and second support members are in the deployed position, the bent portions are positioned to present a profile that mimics the profile of the weight bearing portion of a seat frame having a metal wire network. The elastic material or other biasing member can provide a spring-like sensation to assist the cushion in comfortably supporting a vehicle seat occupant. The inelastic material may prevent the bent portions of the first and second support members from moving beyond the deployed position and may prevent the vehicle seat occupant from bottoming out on a floor surface of the vehicle. When the vehicle seat occupant egresses the seat, the elastic material urges the bent portions of the first and second support members towards one another causing the first and second support members to rotate back to the retracted position.

A seat bottom configured as described above permits the seat bottom to have a lower overall height by having a low height seat frame and a low thickness seat cushion. This, in turn, permits a vehicle seat assembly equipped with the above-described seat bottom to be mounted in a confined vertical space without compromising seat occupant head room or comfort. A greater understanding of the embodiments of the invention described herein may be obtained through a review of the detailed description set forth below together with a review of the accompanying illustrations.

Figure 1:
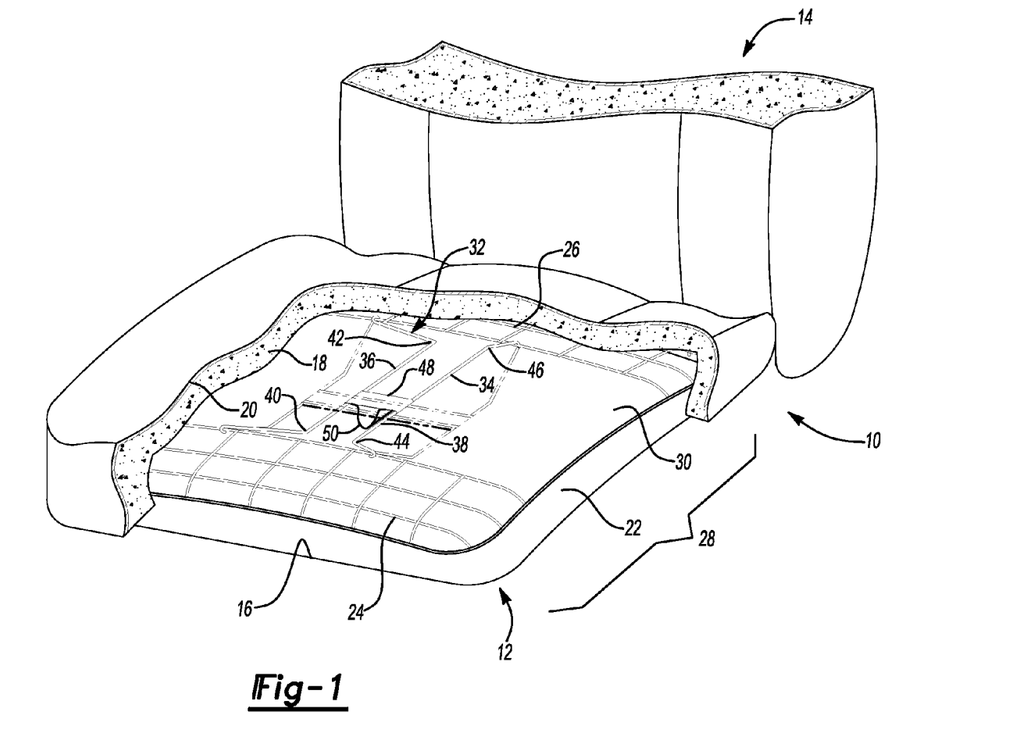
FIG. 1 is a fragmentary perspective cutaway view of a seat bottom made in accordance with the teachings of the present invention.

With respect to FIG. 1, a perspective view of a vehicle seat assembly 10 configured for attachment to a vehicle is illustrated. The vehicle seat assembly may be installed in any type of vehicle including, but not limited to, an automobile, a train, aircraft, water craft, and spacecraft. Furthermore, it should be understood that embodiments of the present invention may be employed in vehicle seat assemblies disposed at any location throughout a vehicle's passenger cabin and not only in a rear portions or portions having limited vertical space.

Vehicle seat assembly 10 includes a seat bottom 12 and a backrest 14. In many embodiments, backrest 14 may be connected to seat bottom 12. In some embodiments, backrest 14 may be pivotally connected to seat bottom 12 to allow for the storage of cargo or further reclining of backrest 14 to enhance the comfort of the seat occupant. Seat bottom 12 includes a seat bottom frame subassembly 16, a seat bottom cushion 18 supported on seat bottom frame subassembly 16, and a trim member 20 disposed over seat bottom cushion 18. Trim member 20 may be made of any suitable material including, but not limited to, leather and/or cloth. Seat bottom cushion 18 may also be made of any suitable material including foam materials such as, but not limited to, polyurethane.

The seat bottom frame subassembly 16 includes a base support member 22 configured generally to conform to the desired shape of the seat bottom. A first network of metal wires 24 is attached to and supported by base support member 22 at a forward portion of base support member 22. A second network of metal wires 26 is attached to and supported by a rear portion of base support member 22. In the illustrated embodiment, base support member 22 is depicted as a metal strap configured in a generally rectilinear arrangement. The metal strap is depicted as a much thicker member than the individual wires comprising the first and second network of metal wires 24, 26. It should be understood that, in other embodiments, base support member 22 may comprise a single strand of metal wire substantially identical in gage to the individual wires comprising first and second networks of metal wires 24, 26.

Base support member 22, first network of metal wires 24 and second network of metal wires 26 together comprise platform portion 28. In other embodiments, platform portion 28 may comprise a single contoured sheet of metal or other suitable material such as a polymeric material, a wood material and other materials having sufficient structural rigidity to support the anticipated weight of a vehicle seat occupant.

An aperture 30 is defined in platform portion 28. Aperture 30 is sized, configured and positioned to correspond with a portion of seat bottom cushion 18 that is anticipated to support a portion of the weight of a seat occupant. A first support member 32 and a second support member 34 are suspended across aperture 30 from first network of metal wires 24 to second network of metal wires 26. First support member 32 includes a first bent portion 36 and second support member 34 includes a second bent portion 38. First bent portion 36 includes two bends 40, 42 and a generally straight portion disposed between bend 40 and bend 42. Similarly, second bent portion 38 includes two bends 44, 46 and a generally straight portion disposed between bend 44 and bend 46.

First and second support members 32, 34 are illustrated in FIG. 1 in two different positions. As depicted in solid lines, first and second support members 32, 34 are illustrated in their retracted position. In this position, first bent portion 36 and second bent portion 38 are proximate or facing one another. As depicted in phantom lines, first and second support members 32, 34 are illustrated in the deployed position as they would be positioned when an occupant sits in vehicle seat assembly 10. In the deployed positions, first and second bent portions 36, 38 have moved downward with respect to platform portion 28 and outward away from one another. With the first and second bent portions 36, 38 disposed generally in a downward direction, first and second support members 32, 34 have a profile that, when viewed from the side, generally conforms to the posterior of a vehicle seat occupant. This configuration can provide enhanced comfort to the occupant.

To retain first and second support members 32, 34 in the retracted position when vehicle seat assembly 10 is not occupied, a biasing member 48 is attached between first and second support members 32, 34. In the illustrated embodiment, biasing member 48 comprises an elastic material that is in tension when first and second support members 32, 34 are in the retracted position. In this manner, biasing member 48 constantly biases first and second support members 32, 34 towards the retracted position. The biasing force of biasing member 48 may be specified such that the weight of an occupant of vehicle seat assembly 10 will overcome the biasing force of biasing member 48 and move first and second support members 32, 34 from the retracted to the deployed position. In other embodiments, the biasing force of biasing member 48 may be specified such that the weight of an average seat occupant will not be sufficient to move first and second support members 32, 34 from the retracted position to the deployed position. In this manner, biasing member 48 may provide added shock absorbency. A biasing member 48 having such an elevated biasing strength may be desirable in situations including, but not limited to, vehicle seat assemblies attached to vehicles that travel off road and thus encounter high impact shock forces.

Although biasing member 48 is depicted as a single sheet of elastic material connecting first and second bent portions 36, 38 to one another, it should be understood that in other embodiments, separate biasing members may be used to urge first support member 32 and second support member 34 toward their respective retracted positions. In still other embodiments, two or more sheets of elastic material may connect first and second bent portions 36, 38 to one another. In still other embodiments, a single sheet of elastic material spanning an entire length or a substantially an entire length of first and second support members 32, 34 may be employed.

In order to limit the distance between first bent portion 36 and second bent portion 38 while first and second support members 32, 34 are in the deployed position, a limiting member 50 is attached to first support member 32 and/or second support member 34 to limit the distance that first and second support members 32, 34 can pivot about their respective connections to platform 28. The limiting member 50 may be made of an inelastic material including, but not limited to, canvas, a rigid yarn, or any other material that is substantially inelastic. In other embodiments, hinged linkages may be employed. In still other embodiments, a tether may be used to limit the movement of first and second bent portions 36, 38 away from one another. Limiting member 50 ensures that first and second support members 32, 34 do not rotate beyond the deployed position when an occupant sits down on vehicle seat assembly 10.

Figure 2:
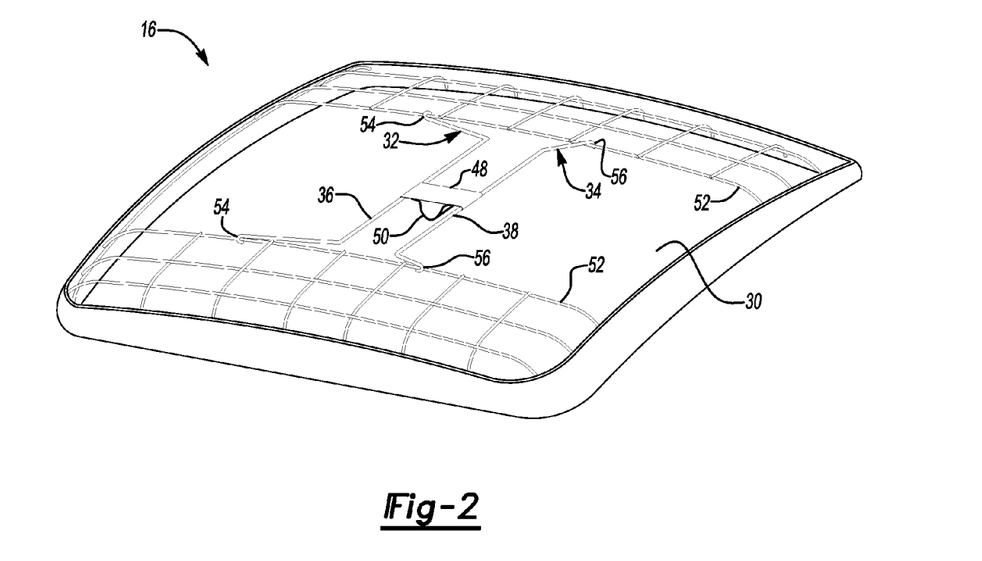
FIG. 2 is perspective view of a seat frame for use with the seat bottom of FIG. 1 with the first and second support members illustrated in a refracted position.

With respect to FIG. 2, the seat bottom frame subassembly 16 of FIG. 1 is illustrated without seat bottom cushion 18 or trim member 20. As illustrated here, first and second support members 32, 34 are held in the retracted position by biasing member 48. Limiting member 50, in this embodiment, a sheath of canvas material, hangs down limply in a state of slack because first and second bent portions 36, 38 are positioned proximate one another. In this illustration, it can be seen how first and second support members 32, 34 are affixed to a wire member 52 defining a portion of aperture 30. The end portions 54 of first support member 32 and end portions 56 of second support member 34 are loosely bent around wire member 52. This configuration provides sufficient freedom of movement between first and second support members 32, 34 on the one hand and wire member 52 on the other hand which permits first and second support members 32, 34 to pivot. In other embodiments, other mechanisms, including, but not limited to, a ball joint or a hinge may be employed to permit first and second support members 32, 34 to pivot from the retracted to the deployed positions.

Figure 3:
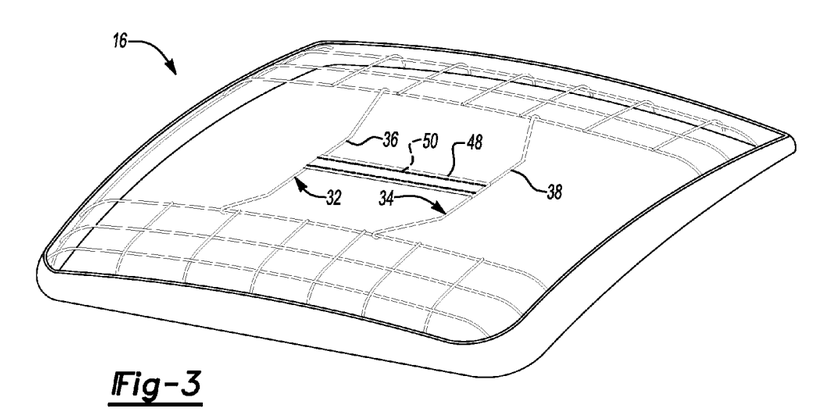
FIG. 3 is a perspective view illustrating the seat frame of FIG. 2 with the first and second support members in a deployed position.

With respect to FIG. 3, seat bottom frame subassembly 16 is illustrated while first and second support members 32, 34 are disposed in the deployed position. In this illustration, first and second bent portions 36, 38 are hanging in a generally downward direction and have moved away from one another. Biasing member 48 has elongated under the tension caused by the load on vehicle seat assembly 10 and the slack illustrated in limiting member 50 of FIG. 2 has been taken up and limiting member 50 is now stretched taut.

Figure 4:
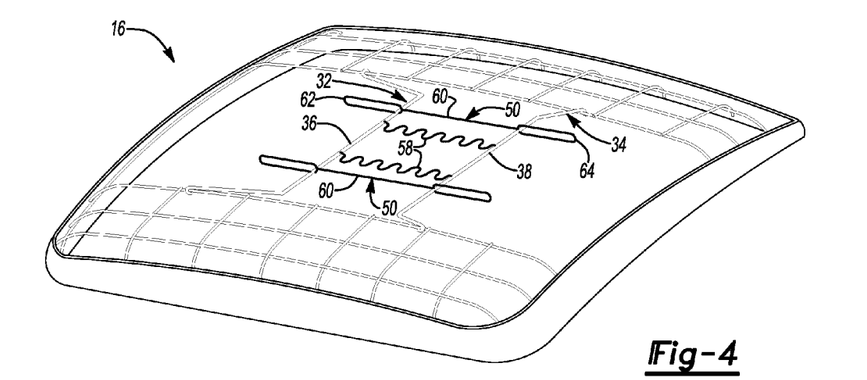
FIG. 4 is a perspective view illustrating an alternate embodiment of this seat frame for use with the seat bottom illustrated in FIG. 1 with first and second support members illustrated in a retracted position.

With respect to FIG. 4, an alternate embodiment of seat bottom frame subassembly 16 as illustrated. In this embodiment, a pair of springs 58 is connected to first and second support members 32, 34 and urge first and second support members 32, 34 towards the retracted position. In other embodiments, a single spring 58 may suffice. In still other embodiments, more than two springs 58 may be utilized. In this embodiment, a pair of limiting members 50 is utilized to limit the outward movement of first and second bent portions 36, 38 away from one another as vehicle seat assembly 10 is loaded. In this embodiment, limiting member 50 comprises a rod 60 having first loop portion 62 and second loop portion 64 disposed at opposite ends of rod 60. Rod 60 and first and second portions 62, 64 may be made of any suitable material including, but not limited to, metal or polymeric material. First and second bent portions 36, 38 are threaded through first and second loop portions 62, 64 respectively and the outward movement of first and second bent portions 36, 38 away from one another is limited by first and second loop portions 62, 64. In FIG. 4, first and second support members 32, 34 are disposed in the retracted position.

Figure 5:
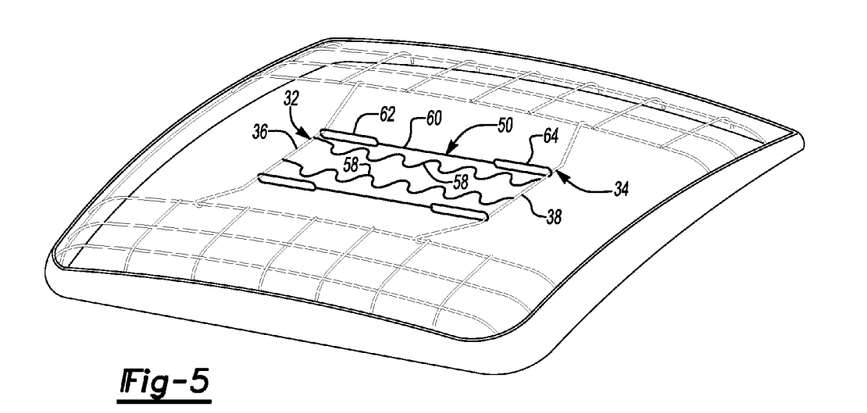
FIG. 5 is a perspective view illustrating the seat frame of FIG. 4 with the first and second support members illustrated in a deployed position.

With respect to FIG. 5, first and second support members 32, 34 have moved to the deployed position. Accordingly, first and second bent portions 36, 38 have moved away from one another and are limited from further outward movement by the distant ends of first and second loop portions 62, 64. Springs 58 have been elongated. It should be understood by those of ordinary skill in the art that springs 58 may be used in combination with the limiting member 50 illustrated in FIGS. 2 and 3. Similarly, the limiting member 50 depicted in FIGS. 4 and 5 may be used in combination with the biasing member 48 illustrated in FIGS. 2 and 3. Other combinations may also be suitable and effective to control the movement of first and second support members 32, 34 between the deployed and retracted positions.

Figure 6A:
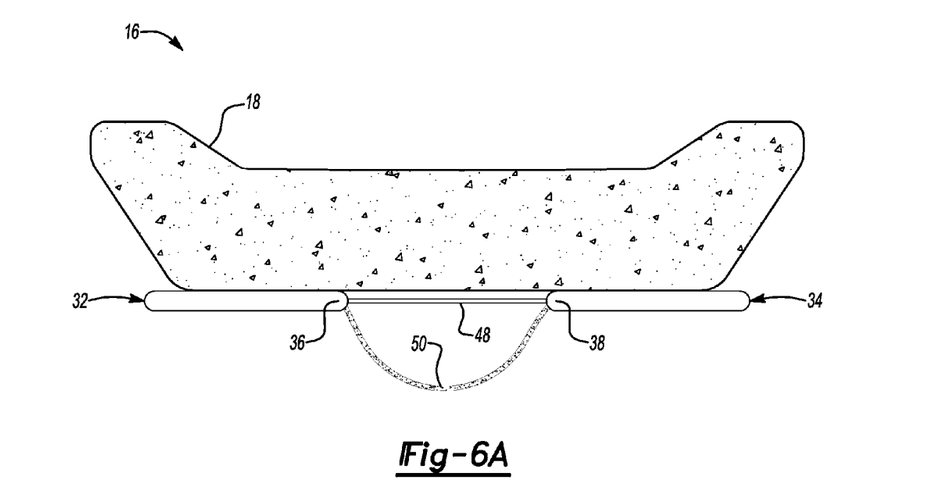
FIG. 6A is a fragmentary schematic front view of a portion of the cushion illustrated in FIG. 2 with the first and second support members illustrated in a retracted position.

With respect to FIG. 6A, a schematic, fragmentary side view of seat bottom cushion 18 and first and second support members 32, 34 viewed in the longitudinal direction is depicted with first and second support members 32, 34 disposed in the retracted position. In this view, biasing member 48 is illustrated in tension holding first and second support members 32 and 34 in the retracted position with the first and second bent portions 36, 38 disposed proximate one another. Limiting member 50 is slack and hangs in a downward direction. In this Figure, it can be seen that first and second support members 32, 34 are configured such that the first and second bent portions 36, 38 are generally coplanar with the remainder of first and second support members 32, 34. Such a coplanar configuration contributes to seat bottom 12 having as thin a profile as possible.

Figure 6B:
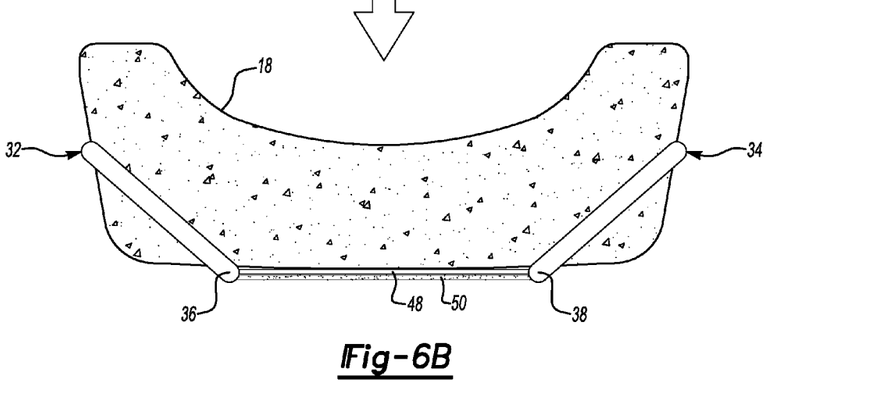
FIG. 6B is a fragmentary schematic front view of the cushion of FIG. 6A with the first and second support members in the deployed position.

With respect to FIG. 6B, a load L has been loaded onto seat bottom cushion 18. The force of load L is sufficient to overcome the biasing force of biasing member 48. This, in turn, has caused first and second support members 32, 34 to pivot about their connection to platform portion 28 with the result that first end portion 36 and second bent portion 38 move in a generally downward direction and outward away from one another until further outward motion is inhibited by limiting member 50. By configuring seat bottom frame subassembly 16 in this manner, seat bottom cushion 18 can compress downwardly into a space that would otherwise be occupied by a conventional metal wire network. Thus, a comfortable seat can be provided for a seat occupant in a confined space where a conventional vehicle seat could not be comfortably utilized given certain height limitations.

Figure 7A:
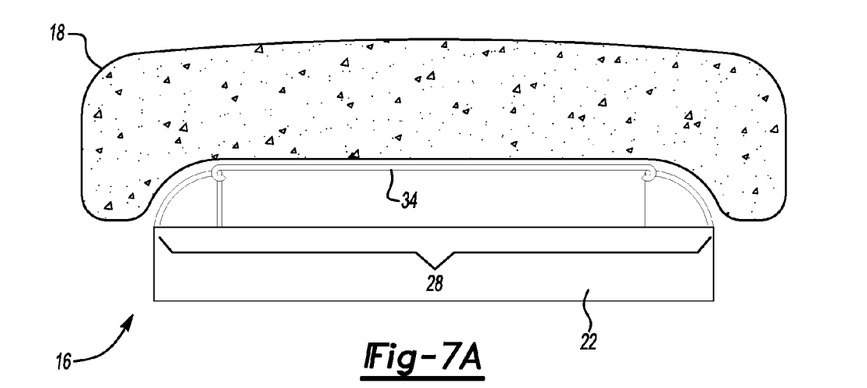
FIG. 7A is a fragmentary schematic side view illustrating the seat frame of FIG. 2 with a cushion and with the first and second support members in the retracted position.

FIGS. 7A and B, are schematic side views illustrating the seat bottom frame subassemblies 16 of FIGS. 6A and B from a lateral perspective. As used herein, the term "lateral" refers to a direction generally perpendicular to the direction of vehicle travel. In FIG. 7A, second support member 34 is visible and first support member 32, which is disposed behind second support member 34 (from the perspective of FIG. 7A) is not visible. In FIG. 7A, it can be seen that, while vehicle seat assembly 10 is unoccupied, platform portion 28 and first and second support members 32, 34 form a generally flat surface to support seat bottom cushion 18. This provides an aesthetically pleasing appearance and avoids a situation where seat bottom cushion 18 appears sunken in as it might appear if there were no biasing means urging first and second support members 32, 34 towards the retracted position.

Figure 7B:
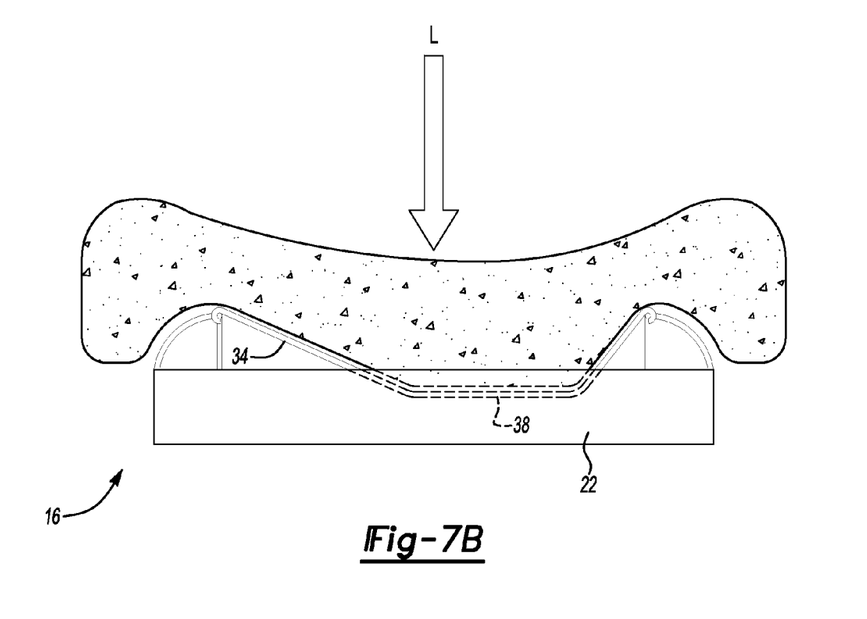
FIG. 7B is a fragmentary schematic side view illustrating the seat frame and the cushion of FIG. 7A with the first and second support members illustrated in the deployed position.

With respect to FIG. 7B, seat bottom frame subassembly 16 is illustrated after load L has been applied to seat bottom 12. Second support member 34 has moved to the deployed position such that second bent portion 38 is disposed in a generally downward direction. In this view, the profile of second support member 34 is clearly illustrated and, thus, it can be seen how it is configured to accommodate the posterior of a vehicle seat occupant and thus provide a comfortable seating surface for a seat occupant of vehicle seat assembly 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
a cushion and a frame subassembly disposed adjacent to the cushion, the frame subassembly including:
a platform portion having a first wire that supports the cushion and that borders an aperture;
first and second support members that are pivotally coupled to the first wire and are configured to pivot between a retracted position and a deployed position in response to a load applied to the cushion; and
a biasing member that includes an elastic fabric material and that urges the first support member and the second support member toward the retracted position;
wherein the first and second support members cooperate to support the cushion when the first and second support members are in the deployed position and wherein the first and second support members and the biasing member are not disposed inside the cushion.

2. The vehicle seat assembly of claim 1 wherein the first support member and the second support member are configured to pivot away from each other when moving from the retracted position to the deployed position.

3. The vehicle seat assembly of claim 1 further comprising a limiting member configured to inhibit movement of the first support member and the second support member beyond the deployed position.

4. The vehicle seat assembly of claim 1 wherein the biasing member attaches the first support member to the second support member.

5. The vehicle seat assembly of claim 1 wherein the biasing member is a spring.

6. The vehicle seat assembly of claim 1 further comprising a limiting member connecting the first support member to the second support member, the limiting member being configured to inhibit movement of the first support member and the second support member beyond the deployed position.

7. The vehicle seat assembly of claim 6 wherein the limiting member comprises a substantially inelastic fabric material.

8. The vehicle set assembly of claim 6 wherein the limiting member comprises a rod having a first end having a first loop portion and a second end having a second loop portion, the first support member extending through the first loop portion and the second support member extending through the second loop portion.

9. The vehicle seat assembly of claim 1 wherein the first support member comprises a first end, a second end and a first bent portion disposed between the first end and the second end of the first support member and wherein the second support member comprises a first end, a second end and a second bent portion disposed between the first end and the second end of the second support member.

10. The vehicle seat assembly of claim 9 wherein the biasing member urges the first bent portion and the second bent portion towards one another to retain the first support member and the second support member in the retracted position in the absence of the load and wherein the first bent portion and the second bent portion are configured to face in a generally downward direction when the first support member and the second support member are in the deployed position.

11. The vehicle seat assembly of claim 9 wherein the first bent portion is substantially coplanar with a remainder of the first support member and wherein the second bent portion is substantially coplanar with a remainder of the second support member.

12. The vehicle seat assembly of claim 1 further comprising a second wire that is spaced apart from the first wire, wherein the first and second support members are pivotally coupled to the second wire.

13. The vehicle seat assembly of claim 12 wherein the first and second wires extend longitudinally across the aperture.

14. A vehicle seat assembly comprising:
a seat bottom having a seat cushion and a seat bottom frame subassembly disposed adjacent the cushion, the seat bottom frame subassembly including:
a platform portion having an aperture;
a first support member suspended from the platform portion across the aperture;
a second support member suspended from the platform portion across the aperture, the first support member and the second support member being configured to pivot between a retracted position and a deployed position when a load is applied to the cushion;
a biasing member connecting the first support member to the second support member, wherein the biasing member comprises an elastic fabric material and urges the first support member and the second support member towards the retracted position; and
a limiting member that is spaced apart from the platform portion and attached to the first and second support members to limit the pivoting of the first and second support members;
wherein the limiting member, biasing member, and first and second support members are disposed underneath and outside of the cushion.

15. The vehicle seat assembly of claim 14 wherein the limiting member is configured to inhibit movement of the first support member and the second support member beyond the deployed position.

16. The vehicle seat assembly of claim 15 wherein the limiting member comprises a substantially inelastic fabric material.

17. A vehicle seat assembly comprising:
a seat bottom configured for attachment to a vehicle, the seat bottom having a seat cushion and a seat bottom frame subassembly disposed adjacent the cushion, the seat bottom frame subassembly including a platform portion having an aperture, a first substantially rigid support member suspended from the platform portion in a longitudinal direction across the aperture, a second substantially rigid support member suspended from the platform portion in a longitudinal direction across the aperture, the first support member and the second support member being configured to pivot between a refracted position and a deployed position when a load is applied to the cushion, a spring connecting the first support member to the second support member, the spring urging the first support member and the second support member towards the retracted position, and a rod connecting the first support member and the second support member, the rod having a first end having a first loop portion and a second end having a second loop portion, the first support member extending through the first loop portion and the second support member extending through the second loop portion, the first loop portion and the second loop portion being configured to inhibit movement of the first support member and the second support member beyond the deployed position, wherein the first support member and the second support member cooperate with each other to support the cushion when the first support member and the second support member are in the deployed position.

* * * * *